D. BITTNER, Jr.
DIRIGIBLE HEADLIGHT.
APPLICATION FILED OCT. 30, 1916.
1,217,140.
Patented Feb. 27, 1917.
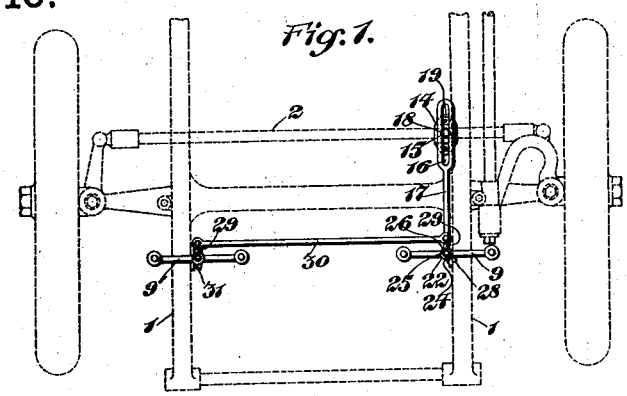
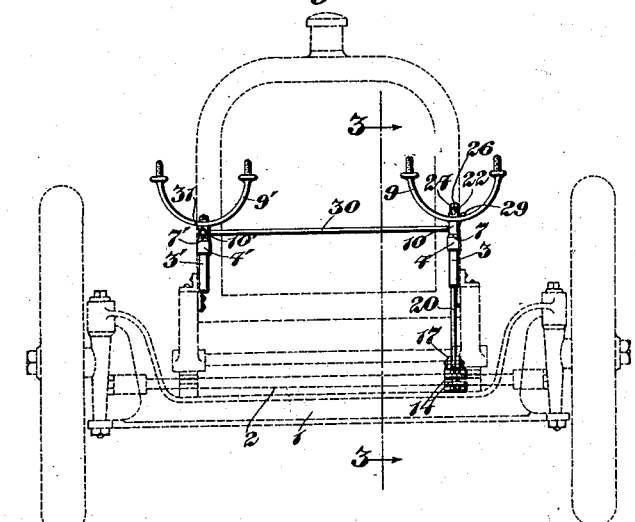
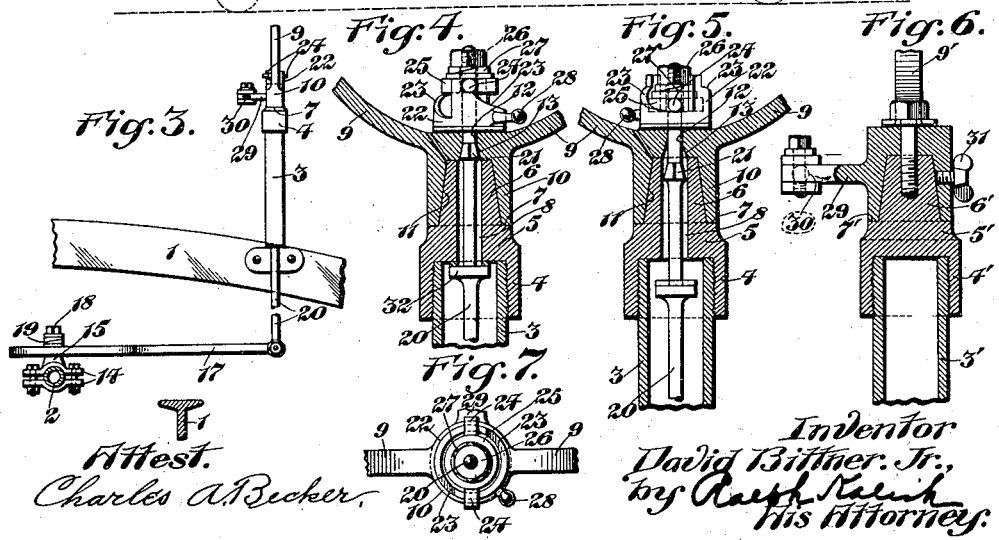
Attest.
Charles A. Becker.
Inventor
David Bittner, Jr.,
by Ralph Kalish
His Attorney.

UNITED STATES PATENT OFFICE.

DAVID BITTNER, JR., OF ST. LOUIS, MISSOURI.

DIRIGIBLE HEADLIGHT.

1,217,140.    Specification of Letters Patent.    Patented Feb. 27, 1917.

Application filed October 30, 1916. Serial No. 128,465.

*To all whom it may concern:*

Be it known that I, DAVID BITTNER, Jr., a citizen of the United States, residing at the city of St. Louis, State of Missouri, have invented a certain new and useful Improvement in Dirigible Headlights, of which the following is a specification, reference being had to the accompanying drawing, forming a part thereof.

This invention relates to a certain new and useful improvement in dirigible headlights for automobiles and the like, the objects of my present invention being to provide a headlight of the kind and for the purpose stated which is comparatively simple and inexpensive in construction and efficient in use and operation, and which may be conveniently operatively mounted upon the car or other vehicle, and to improve generally upon and simplify the construction of devices of the class described.

With the above and other objects in view, my present invention resides in certain novel features of form, construction, arrangement, and combination of parts, all as will hereinafter be described and afterward pointed out in the claims.

In the accompanying drawing, which illustrates my invention in the preferred form,—

Figure 1 is a fragmentary plan view of an automobile equipped with my invention;

Fig. 2 is a front elevational view of the same;

Fig. 3 is an enlarged fragmentary sectional view on approximately the line 3—3, Fig. 2;

Fig. 4 is an enlarged fragmentary sectional view of one of the lamp-supports and its bearing, the lamp-shifting or rotarily actuating shaft being shown in operative engagement with the lamp-support;

Fig. 5 is a similar view of the lamp-support and its bearing shown in Fig. 4, the lamp-shifting shaft, however, being shown disengaged from, or out of operating shifting position relatively to, the lamp-support;

Fig. 6 is a similar view of the opposite lamp-support and its bearing; and

Fig. 7 is a plan view of the lamp-support and bearing shown in Figs. 4 and 5.

Referring to the said drawing, in which like reference characters refer to like parts throughout the several views, I have shown in dotted lines a portion of an automobile of any usual or approved construction, the same including a chassis or frame 1 and a connecting-rod 2 forming part of the steering mechanism of the car, as will be well understood.

Suitably fixed upon the frame 1 at opposite sides, and at the front, of the car, as seen in Fig. 2, are suitable vertically disposed tubular members 3—3'.

Threaded upon the upper end of one of said members, as, for instance, member 3, is a flanged closure cap or lamp-bearing 4 provided upon its end wall 5 with an upwardly presented substantially truncated cone-shaped extension 6 of reduced diameter at its base relatively to the diameter of the upper face of cap end wall 5, the marginal portion of the upper face of end wall 5 providing an annular shoulder or bearing-face, as at 7. Cap 4 in its end wall 5 and extension 6 is provided with a bore, as at 8, of suitable diameter, which communicates with the bore of tubular member 3, as seen in Figs. 4 and 5.

9 indicates a suitable lamp-support or yoke, which is provided with a depending enlargement 10 interiorly recessed, as at 11, to accommodate and fit extension 6 of cap 4, the lamp-support 9, as illustrated particularly in Figs. 4 and 5, being seated at its enlargement 10 upon the cap 4 and its extension 6 so as to rotarily shift thereupon. At its base, the lamp-support is provided with a bore 12 communicating or registering with the bore 8 of cap 4 and its extension 6, the bore 12 including a substantially squared or pyramidal portion or clutch-recess 13.

Fixed upon the connecting-rod 2 in operative position relatively to tubular member 3, are suitable split collars or the like 14 provided with an upwardly presented pin or stud 15 threaded at its upper end. Provided longitudinally at one end with a slot 16 and pivotally mounted at said slot upon the pin or stud 15, is a forwardly projecting rod or bar 17 disposed approximately horizontally of the car. Threaded upon the pin or stud 15 to operatively secure the rod 17 in position, is a nut or the like 18, a spring-washer 19 being interposed on the pin or stud 15 between the nut 18 and rod 17, as seen particularly in Fig. 3.

Pivotally fastened at its lower end to the forward or free end of rod 17, is a shaft 20 projecting upwardly through tubular member 3 and the registering bores 8 and 12 of cap 4 and lamp-support 9, respectively, as seen in Figs. 3, 4, and 5, the shaft 20 being provided with a clutch portion 21 adapted to fit in the coöperating portion 13 of bore 12 of, and thereby operatively or shiftingly engage with, lamp-support 9.

Rotarily fitting upon the upper end of shaft 20 and having a bearing upon the lamp-support 9, as also seen in Figs. 4 and 5, is a member 22 provided with a plurality of cam-faces 23—23, upon which cam-faces are adapted to ride suitable oppositely disposed pins 24—24 projecting outwardly from a circular member 25 fitting upon the shaft 20 and secured thereupon by means of a nut 26 and interposed spring-washer 27 or the like, as seen in Figs. 4 and 5. Projecting outwardly from cam-member 22, is a handle 28 for rotarily actuating the same.

Threaded upon the opposite member 3', is an approximately similar flanged cap 4' likewise provided with an annular bearing face 7' and extension 6'. Seated to rotarily shift upon the cap 4' and its extension 6', is a lamp-support 9'.

Each of the lamp-supports 9 and 9' is provided with a projecting arm 29, pivotally connected at its ends to, and extending between which arms 29 is a connecting-rod 30, whereby the lamp-supports 9 and 9' and their carried or supported lamps (not shown) will shift or move in unison.

In use or operation, when the cam-member 22 is in the position thereof illustrated in Fig. 4, or in what I may designate as operative or lamp-shifting position, the pins 24 of member 25 will engage said cam-faces 23 at approximately their highest point and shaft 20 will engage at its clutch portion 21 with the coöperating portion or clutch-recess 13 of bore 12 of the lamp-support 9. With shaft 20 in such operative or shifting engagement with the lamp-support 9, it will be evident that as the connecting-rod 2 is swung in the steering of the wheels of the car, the lamp-support 9, and therewith opposite lamp-support 9', as before described, will be correspondingly shifted.

Should it be desired, as, for instance, in daylight, to disengage or disconnect the shifting rod 30 from the lamp-support 9, the cam-member 22 is properly rotarily actuated to the position thereof illustrated in Fig. 5, when pins 24 will ride down the cam-faces 23 and shaft 20 will drop to inoperative position relatively to the lamp-support 9, its portion 21 moving out of driving engagement with the portion 13 of bore 12 of the lamp-support 9. When in such position, to prevent any shifting of the lamps due to movement of the car, a set-screw or the like 31 threaded in lamp-support 9' is actuated to impinging engagement with the lamp-bearing or cap 4'.

To again operatively engage the shaft 20 with the lamp-support 9, so that the lamps of the car will shift with and as the wheels of the car are shifted or steered, the cam-member 22 is reversely rotarily actuated to the position thereof illustrated in Fig. 4, when the pins 24 will ride up the cam-faces 23 and shaft 20 brought into operative, clutch-wise engagement at its portion 21 with the portion 13 of bore 12 of the lamp-support 9, as before described, an annular shoulder or enlargement 32 on the shaft 20 being adapted to engage with the under face of end wall 5 of cap 4 when the shaft 20 is in such operative or lamp-shifting position to assist in operatively holding the lamp-support to its seat under the engagement of the pins 24 with the cam-faces 23 of the cam-member 22.

I am aware that minor changes in the form, construction, arrangement, and combination of the several parts of my new headlight may be made and substituted for those herein shown and described without departing from the nature and principle of my invention.

Having thus described my invention, what I claim and desire to secure by Letters Patent is:

1. A dirigible headlight mechanism including a tubular lamp-bearing, a lamp-support rotarily seated on said bearing, said support having a clutch-recess, a shaft extending longitudinally through the lamp-bearing, means for connecting the shaft at one end with the steering mechanism of a vehicle, and a clutch-member on the shaft at its other end, said clutch-member being adapted for engagement with the clutch-recess of the lamp-support.

2. A dirigible headlight mechanism including a tubular lamp-bearing, a lamp-support rotarily seated on said bearing, said support having a clutch-recess in alinement with the bore of the tubular bearing, a shaft extending longitudinally through the lamp-bearing, means for connecting the shaft at one end with the steering mechanism of a vehicle, a clutch-member on the other end of the shaft adapted for releasable engagement with said clutch-recess, and means on the shaft for actuating the same to engage and disengage the clutch-member with and from the clutch-recess.

3. A dirigible headlight mechanism including a tubular lamp-bearing, a lamp-support rotarily seated on said bearing, said support having a bore and clutch-recess alining with the bore of said bearing, a shaft extending at its upper end longitudinally through the bearing and the bore and clutch-recess of said support, means for connecting the shaft at its lower end with the steering mechanism of a vehicle, a clutch-member on the shaft adapted for releasable engagement with said clutch-recess, and means on the upper end of the shaft for actuating the shaft to engage and disengage the clutch-member with and from the clutch-recess, said last-named means including a cam-member rotarily movable on the shaft, and pins on the shaft for coöperating with the cam-member.

In testimony whereof, I have signed my name to this specification.

DAVID BITTNER, Jr.